(12) United States Patent
Jacobs et al.

(10) Patent No.: US 10,080,233 B2
(45) Date of Patent: *Sep. 18, 2018

(54) METHOD FOR PROVIDING M2M DATA

(71) Applicant: NEC CORPORATION, Tokyo (JP)

(72) Inventors: Tobias Jacobs, Mannheim (DE);
Salvatore Longo, Mantova (IT)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,845

(22) Filed: Dec. 27, 2017

(65) Prior Publication Data

US 2018/0124810 A1 May 3, 2018

Related U.S. Application Data

(63) Continuation of application No. 15/526,343, filed as application No. PCT/EP2014/074400 on Nov. 12, 2014, now Pat. No. 9,907,087.

(51) Int. Cl.
*H04W 4/00* (2018.01)
*H04W 72/12* (2009.01)
(Continued)

(52) U.S. Cl.
CPC .......... *H04W 72/1242* (2013.01); *G06F 9/54* (2013.01); *G06F 9/542* (2013.01);
(Continued)

(58) Field of Classification Search
CPC .............. H04W 72/1242; H04W 4/005; G06F 17/30283; H04L 67/2842
See application file for complete search history.

(56) References Cited

U.S. PATENT DOCUMENTS 9,907,087 B2 * 2/2018 Jacobs .................... H04W 4/70
2016/0048596 A1 2/2016 Papageorgiou et al.
2016/0112256 A1 4/2016 Papageorgiou et al.

FOREIGN PATENT DOCUMENTS

GB 2479617 A 10/2011
GB 2482417 A 2/2012
WO WO 2012121776 A1 9/2012

OTHER PUBLICATIONS

Eugene A. Feiberg, Michael Curry: "Generalized Pinwheel Problem", Mathematical Methods of Operations Research, vol. 62, Apr. 2005 (Apr. 2005), pp. 99-122, XP002736921.
(Continued)

*Primary Examiner* — Afshawn M Towfighi
(74) *Attorney, Agent, or Firm* — Leydig, Voit & Mayer, Ltd.

(57) ABSTRACT

A method for providing M2M data items according to M2M data subscriptions retrieved from an M2M frontend (FE) by an M2M backend (BE) to one or more M2M applications includes representing the data items by a set of parameters including a required update frequency and a weight representing an importance of the data item; determining a schedule for retrieving data items from the FE by the BE based on the weights of the data items; determining that an actual period required to update each of one or more respective data items is larger than a required period corresponding to the required update frequency and adding a penalty value to the weight of each of the respective one or more data items to provide updated weights; and modifying the schedule based on the updated weights.

11 Claims, 2 Drawing Sheets

(51) Int. Cl.
*H04W 4/70* (2018.01)
*G06F 9/54* (2006.01)
*G06F 17/30* (2006.01)
*H04L 29/08* (2006.01)

(52) U.S. Cl.
CPC ........ *G06F 17/30283* (2013.01); *H04W 4/70* (2018.02); *H04L 67/2842* (2013.01)

(56) References Cited

OTHER PUBLICATIONS

Open Mobile Alliance: "NGSI Context Management", May 29, 2012 (May 29, 2012).

* cited by examiner

METHOD FOR PROVIDING M2M DATA

CROSS REFERENCE TO RELATED APPLICATIONS

This application is a continuation of U.S. patent application Ser. No. 15/526,343 filed on May 12, 2017, which is a U.S. National Stage Application under 35 U.S.C. § 371 of International Application No. PCT/EP2014/074400 filed on Nov. 12, 2014. The International Application was published in English on May 19, 2016 as WO 2016/074714 A1 under PCT Article 21(2).

FIELD

The present invention relates to a method for providing M2M data, wherein one or more M2M applications—AP—provide M2M data subscriptions to a M2M backend—BE—and the BE provides M2M data received from a M2M frontend—FE—to the AP. The present invention further relates to a system for a M2M backend—BE—.

BACKGROUND

Machine-to-machine scenarios typically comprise one or more M2M applications which require M2M data in regular time intervals. The M2M application therefore provides M2M data subscriptions to an M2M backend which in turn contacts an M2M frontend to obtain the data. The M2M backend then provides the received M2M data from the M2M frontend to the M2M application. However the communication channel between the M2M frontend and the M2M backend may have limited bandwidth which in turn limits the possibility of the M2M backend to obtain fresh data on behalf of the M2M application.

To address this problem data is usually cached in the M2M backend. In M2M usually the backend systems are running on powerful machines in a cloud environment and have enough memory available so that the cache size is not a practical problem. As shown in FIG. 1 the bottleneck in such M2M systems is rather the M2M frontend and its corresponding communication channels. Due to the communication bandwidth, energy constraints and/or processing constraints the rate at which data can be retrieved from the M2M frontend by the M2M backend is limited. This is even more a problem since typical M2M data values become outdated after some time period and thus cannot be served from the cache forever.

Conventional caching strategies are dedicated to the situation where under a limited cache size the hit ratio, i.e. the relative number of data requests, that can be served from the cache, is maximized. When the request data cannot be served from the cache the data needs to be retrieved from elsewhere, for example from the main memory, a disc, network resources or the like. This increases the waiting time for the application in need for the data and thus making the application slower. However all these conventional caching strategies do not capture the situation in an M2M scenario. As described above the cache size is not a problem but the rate which the data can be retrieved from the M2M frontend.

In the non-patent literature of Liaquat Kiani, Saad, et al., "Context caches in the clouds," Journal of Cloud Computing: Advances, Systems and Applications 1.7 (2012) a method is shown for caching of context data in the cloud taking in account data becoming outdated. However there it is still assumed that the cache size is limited rather than the connection between the M2M backend and M2M frontend.

In the non-patent literature of Sazoglu, Fethi Burak, et al. "Strategies for setting time-to-live values in result caches," Proceedings of the 22nd ACM international conference on Conference on information & knowledge management, ACM, 2013 a method is shown to cache results from search engines. The number of accesses to the core search engine per time is considered to be the bottleneck rather than the cache size. However queries to search engines are issued by humans and are therefore sporadic one-time queries. M2M applications however require up-to-date real-world information in regular time intervals and exhibit therefore totally different access patterns. Another difference is that humans do not take notice of outdated search engine query results but M2M applications need to rely on receiving up-to-date information.

SUMMARY

In an embodiment, the present invention provides a method for providing M2M data items according to M2M data subscriptions retrieved from an M2M frontend (FE) by an M2M backend (BE) to one or more M2M applications, wherein a communication channel between the BE and FE has a limited bandwidth. The method includes representing the data items to be provided to the M2M applications by a set of parameters including a required update frequency for the data item and a weight representing an importance of the data item to the one or more M2M applications and/or to the BE; determining a schedule for retrieving data items from the FE by the BE based on the weights of the data items; determining that an actual period required to update each of one or more respective data items is larger than a required period corresponding to the required update frequency for each of the respective one or more data items and adding a penalty value to the weight of each of the respective one or more data items to provide updated weights for each of the respective one or more data items; modifying the schedule based on the updated weights for each of the respective one or more data items such that an overall penalty is minimized, and retrieving, by the BE according to the modified schedule, data items from the FE and caching the retrieved data items.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
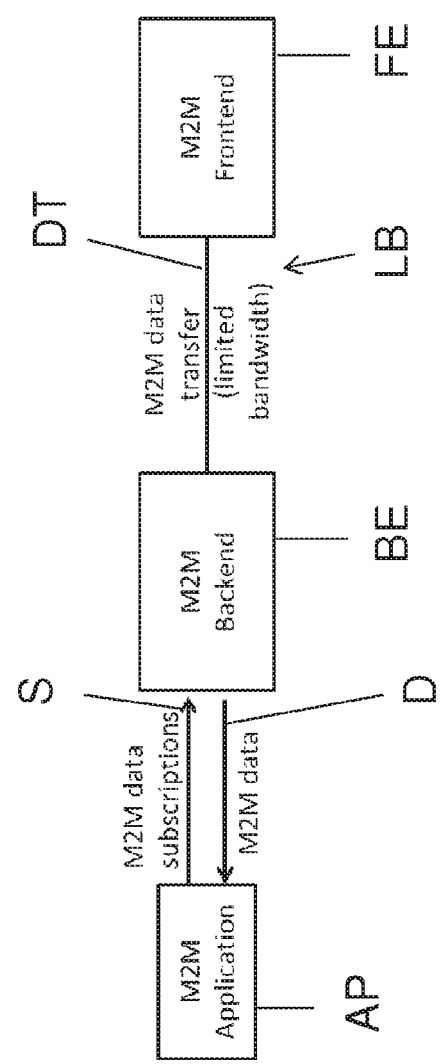
FIG. 1 shows schematically an M2M system on which a method according to an embodiment of the present invention can be performed.

The present invention provides a method for providing M2M data and a backend system which improve the satisfaction of applications when a limited bandwidth between a backend and a frontend of an M2M system is present.

The present invention further provides a method for providing M2M data and a M2M backend providing a more effective use of the available communication bandwidth between a backend and a frontend.

The present invention further provides a method for providing M2M data and a backend which optimize the usage of the available data rate with which an M2M frontend can send up-to-date data.

The present invention further provides optimal or at least near-optimal satisfaction of application subscriptions for fresh M2M data.

The present invention further provides a method for providing M2M data and a backend which can be easily implemented and efficiently executed/performed.

A method is described herein for providing M2M data, wherein one or more M2M applications—AP—provide M2M data subscriptions to a M2M backend—BE—and the BE provides M2M data received from a M2M frontend—FE—to the AP is defined.

According an embodiment, the method is characterized in that when the resources required for communication between the BE and FE exceed or is determined to be exceeded in the future the maximum resource available for communication between the BE and the FE, the following steps are performed:
a) Parametrizing subscriptions by at least three parameters representing
   a data item to be subscribed,
   a required period between data updates for said data item indicating a required actuality of the data for the AP and
   a weight representing the importance of the data item by the AP and/or BE,
b) Determining a schedule for all subscriptions for retrieving data from the FE based on the importance of said data items such that when the actual period with which data updates for a data item can be provided is larger than the required period for said data item a penalty value is added to the weight,
c) Modifying the schedule based on the updated weights according to b) for retrieving data for said data items such that the overall penalty is minimized and/or the overall actuality of said cached data is maximized, and
d) Retrieving of data items from the FE and caching said retrieved data from the FE by the BE, wherein data cached for data items is provided to the AP.

An M2M backend—BE—is described herein. According to an embodiment, the M2M backend is characterized in that when the resources required for communication between the BE and an M2M frontend—FE—exceed or are determined to be exceeded in the future the maximum resource available for communication between the BE and the FE, then the BE is adapted to receive and/or provide subscriptions issued by an M2M application—AP—parametrized by at least three parameters representing
   a data item to be subscribed,
   a required period between data updates for said data item indicating a required actuality of the data for the AP and
   a weight representing the importance of the data item, and further to provide
   a Data Retrieval Scheduler adapted to determine a schedule for all subscriptions for retrieving data from the FE based on the importance of said data items such that when the actual period with which data updates for a data item can be provided is larger than the required period for said data item a penalty value is added to the weight, and to modify the schedule based on the updated weights for retrieving data for said data items such that the overall penalty is minimized and/or the overall actuality of said cached data is maximized,
   an interface adapted to execute the schedule and to retrieve the data items from the FE,
   data caching means adapted to cache said retrieved data from the FE by the BE, and
   application notifying means adapted to provide the data cached for data items to the AP according to the subscriptions.

The M2M backend and/or the M2M frontend may be each a single entity or a plurality of different entities or devices located in different locations interacting with each other. The M2M backend and/or the M2M frontend each can also be a virtualized entity or entities located in the cloud or the like.

According to embodiments of the invention, a high satisfaction of an M2M application can be achieved by minimizing the overall penalty and/or by maximizing the overall actuality of the data.

According to embodiments of the invention, a process of notification of the M2M application can be decoupled from the actual data retrieval by the backend.

According to embodiments of the invention, the data transmission between the M2M backend and the M2M frontend can be actively controlled by the provided schedule optimizing the satisfaction of the M2M applications.

According to embodiments of the invention, a more effective use of the available communication bandwidth between an M2M backend and an M2M frontend can be provided.

According to embodiments of the invention, the overall freshness of data items in a cache can be improved.

According to embodiments of the invention, the total user experience, i.e. the experience of M2M applications, can be improved.

According to embodiments of the invention, an easy implementation can be provided.

According to embodiments of the invention, M2M data can be provided and a backend effectively combining caching with data update scheduling policies can also be provided to reach an improved level of satisfying M2M application requirements under given resource constraints.

According to a preferred embodiment the cached data items are provided by the BE to the AP as subscribed according to the required period from the cache together with non-actuality information and/or directly upon receiving by the BE. This ensures that the AP is provided as soon as possible with an up-to-date value of the requested data or with data which is indicated to be outdated so that the AP can decide whether to use this outdated value or not. Thus efficiency respectively flexibility is enhanced.

According to a further preferred embodiment data items are cached in a key-value store. This allows an effective storage such that for each data item a current data value can be stored.

According to a further preferred embodiment for determining and/or modifying the schedule the following steps are performed:
a. maintaining a set of subscriptions and a schedule satisfying all data retrieval requirements,
b. upon receiving a new subscription by the BE:
   b1) determining the density—d—of said set of subscriptions defined as sum of reciprocals of the required periods,
   b2) if d equals 1, then the subscription is rejected, b3) if d is smaller or greater than 1, the subscription is accepted and the period specified in the subscription is modified such that the modified period is a power of 2, is greater than or equal to the period specified in the subscription and is smaller than or equal to 1-d.

This allows in an efficient way to determine a schedule where for each subscription the data is retrieved with a minimum time interval between two consecutive retrievals. Thus efficiency is further enhanced. Preferably these steps are performed according to the pinwheel scheduling procedure which is for example shown in the non-patent literature of Feinberg, Eugene A., and Michael T. Curry. "Generalized pinwheel problem.", Mathematical Methods of Operations Research 62.1 (2005): 99-122. This ensures that for all accepted subscriptions the data can be delivered as indicated in a corresponding accept message.

According to a further preferred embodiment for determining and/or modifying the schedule the following steps are performed:
a) all subscriptions are accepted,
b) in each time step—t—:
  b1) checking if outdated subscriptions exist
  b2) if yes, query the data item having the maximum product of the weight and the period specified in the subscription among all outdated subscriptions,
  b3) if not, determine for each subscription the time when the corresponding subscription is outdated, and
  b4) querying the data item where the period diminished with the determined outdated time and added with t is multiplied with the weight of the data item is maximal.

These steps avoid that all periods are rounded to the next larger power of two and take the importance of subscriptions into account. This therefore enables to minimize the time periods where data are outdated. It gives preference to already outdated data items and gives also preference to data items with longer periods and larger weights.

According to a further preferred embodiment in case of multiple applications subscribing to the same data item, the different weights as specified in each of the subscriptions for said data item are added up such that the weights for said data item is the sum of said different weights. This allows an efficient handling of multiple applications subscribing to the same data item.

According to a further preferred embodiment if a one-time data item query is provided to the BE, the BE checks whether a recent value for this data item is available in the cache and if yes, provides it to the AP and if not, the one-time query is included into the schedule if the query can be satisfied within a certain future time range, otherwise the one time data item query is rejected. This enables to handle one time queries without having to use subscriptions. Thus an easy implementation and efficient handling of one time queries of data items is provided.

According to a further preferred embodiment the BE analyzes the frequency of same one time data item queries and if a certain frequency is exceeded the BE performs a subscription of said one time data item according to the analyzed frequency. This enables to even more efficiently provide data items for which for example different applications issue one time data item queries without using subscriptions. These data items can then be efficiently provided to the requesting M2M applications. If some data items are for example queried often, then a subscription for this data item is issued so that fresh values of the data are always be available in the data cache.

According to a further preferred embodiment a timeout parameter is specified in a subscription for deletion after a specified time period. This allows enabling subscriptions to be cancelled automatically having a pre-specified duration.

According to a further preferred embodiment the OMA NGSI 9/10 standard for subscribing and for communication between the BE and the FE is used. This provides an easy and reliable implementation with a well-known standard for subscribing and for communication between the BE and the FE. Subscriptions of M2M applications can be realized by the SubscribeContext procedure as specified in NGSI 10. Further this procedure can be used to point out a different notification frequency in the subscription response. Even further the data transmission between BE and FE by the BE invoking the QueryContext procedure defining NGSI 10 can be provided.

According to a further preferred embodiment of the system according to claim 11 the BE comprising query handling means adapted to analyze the frequency of one time data item queries and if a certain frequency is exceeded, the BE is adapted to perform a subscription of said one time data item according to the analyzed frequency. This enables to even more efficiently provide data items for which for example different applications issue one time data item queries without using the subscription. These data items can then be efficiently provided to the requesting M2M applications. If some data items are for example queried often, then a subscription for this data item is issued so that fresh values of the data are always be available in the data cache.

FIG. 1 shows schematically an M2M system on which a method according to an embodiment of the present invention is performed.

In FIG. 1 an M2M setup is shown comprising an M2M application, an M2M backend and an M2M frontend FE. The M2M application AP requires M2M data D in regular time intervals which it tries to obtain by subscriptions S to the M2M backend BE. The M2M backend BE is connected to the M2M frontend FE from which it can obtain the data D. The communication channel DT between the frontend FE and the backend BE has limited bandwidth LB which limits the possibility of the backend BE to obtain fresh data D on behalf of the M2M application AP. According to embodiments of the present invention the application AP subscribes to the M2M backend BE for data items wherein each subscription S specifies three parameters:
(a) A data item i which the M2M application AP subscribes to. For instance, a data item is the reading of a specific sensor.
(b) A required frequency of updates. The M2M application AP requesting data item i with period f(i) requires every f(i) time units a refreshed value of the data item.
(c) A weight w(i) representing the importance of the data item i for the M2M application. Whenever an updated value of data item i is not available when required, this counts as a failure with penalty w(i).

The M2M backend BE targets to maximize the satisfaction of the M2M application AP by minimizing the penalty. For every subscription S to data item i, the backend BE sends every f(i) time steps a notification with a value of data item i to the application AP. The backend BE organizes the communication with the frontend FE trying to make sure that for any notification of any subscription S a fresh data value is delivered.

Figure 2:
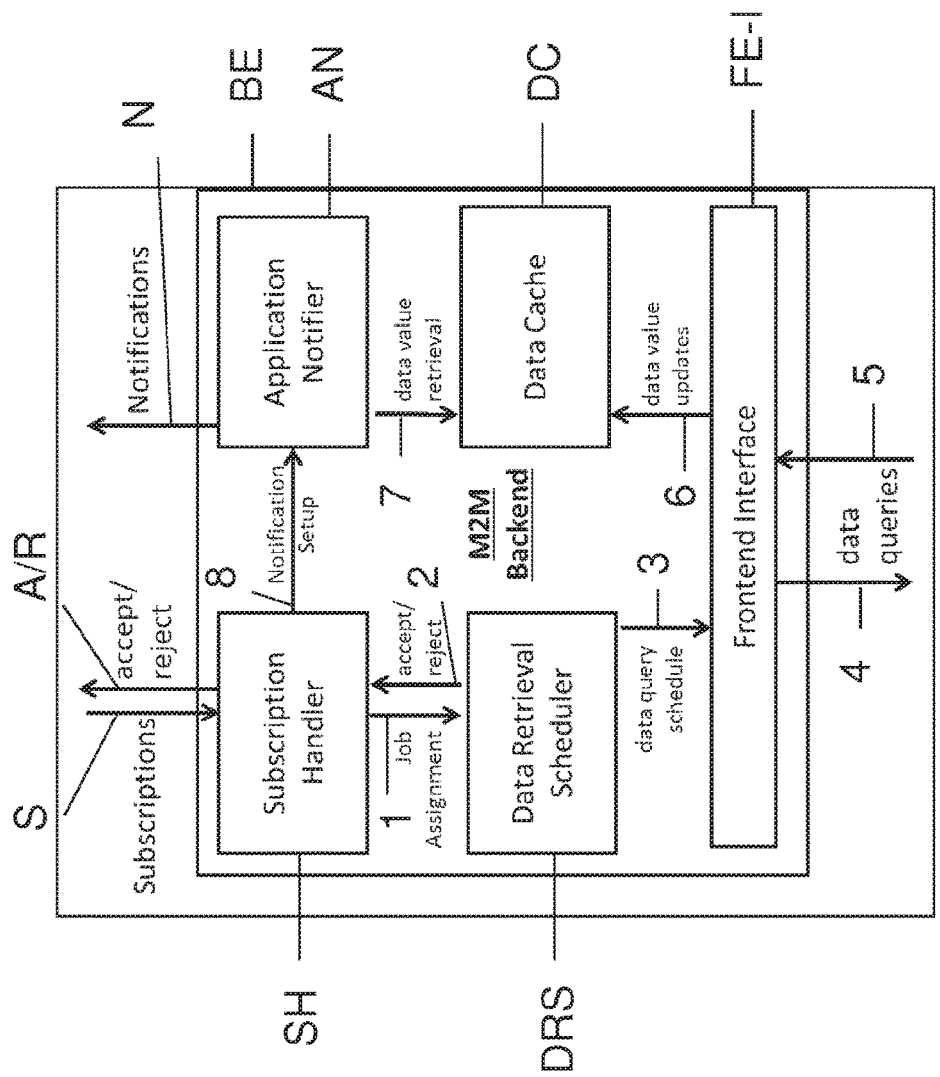
FIG. 2 shows a backend according to a second embodiment of the present invention.

FIG. 2 shows a backend according to a second embodiment of the present invention.

In FIG. 2 an M2M backend BE is shown comprising a subscription handler SH, a Data Retrieval Scheduler DRS, a frontend interface FE-I, a data cache DC and an application notifier AN.

In the following these different components of the backend BE are described.

The Subscription Handler SH:
receives subscriptions S from the M2M application AP. Each subscription S is parameterized by the three parameters [i, f(i), w(i)] described above for FIG. 1.

upon reception of a subscription S from the M2M application AP, it assigns—ref sign 1—the subscription S to the Data Retrieval Scheduler DRS as a job. A job contains the same information as the original subscription S;

from the Date Retrieval Scheduler DRS it receives feedback on whether the subscription S is accepted or not—ref sign 2. Subscriptions S can be rejected because of lacking bandwidth LB on the communication channel;

subscriptions S can be accepted or rejected—ref sign. A/R—by the Data Retrieval Scheduler DRS, but if accepted, only with a lower frequency of notifications N, i.e. a larger f(i). This is preferably invoked by the Data Retrieval Scheduler DRS when there is not enough bandwidth LB left to satisfy the subscription S with the originally requested frequency/period;

In case the subscription S has been accepted, the Subscription Handler SH sends a message—ref sign 8—to the Application Notifier AN to set off the notification process. Then it returns an accept message to the M2M application AP. In case the notification frequency is modified by the Data Retrieval Scheduler DRS, this information is included both in the message to the Application Notifier AN and to the M2M Application AP;

In case the subscription S has been rejected, the rejection is forwarded to the M2M application AP.

The Data Retrieval Scheduler DRS
maintains a schedule. The schedule represents a plan when to query—ref sign 4—which data item from the frontend FE, considering the limited communication bandwidth LB;

whenever it receives a Job Assignment—ref sign 1—from the Subscription Handler SH, the Data Retrieval Scheduler DRS either
rejects the job, or
accepts the job—ref sign 2—as it is and modifies the schedule accordingly, so that the data will be retrieved from the frontend FE, or
accepts the job with a less frequent notification interval and modifies the schedule accordingly.

The Data Retrieval Scheduler DRS always assigns—ref sign 3—the parts of the schedule to be executed in the very near future to the Frontend Interface FE-I.

The Data Retrieval Scheduler DRS then solves a certain class of scheduling problems, which details are given below.

The Frontend Interface FE-I
executes the schedules retrieved by the Data Retrieval Scheduler DRS by sending the corresponding queries to the M2M Frontend—ref sign 4—at the times specified in the schedule,
receives—ref sign 5—and forwards—ref sign 6—the data resulting from the queries to the Data Cache DC.

The Data Cache DC
is preferably a simple key-value store, where for each data item i the current data value is stored. All data is written by the Frontend Interface FE-I, and all data is read by the Application Notifier AN—ref sign 7—.

The Application Notifier AN
executes a set of notification processes. Each notification process is represented by a data item i and a time interval f(i)

For each notification process, every f(i) time units the Application Notifier AN reads the current value of the data item I from the Data Cache DC—ref sign 7—and forwards it to the M2M Application AP—as a data value—ref sign N—.

The Data Retrieval Scheduler DRS organizes the data retrieval from the M2M frontend FE such that preferably the Application Notifier AN always retrieves a new data value when retrieving a data item from the data cache DC. A notification process executed by the Application Notifier AN preferably forwards every f(i) time units the current value of data item i from the data cache DC to the M2M application AP such that it is preferably guaranteed to forward in each iteration a new data value if and only if between two consecutive queries for data item i by the fronted interface FE-I there are no more than f(i) time units. No synchronization is therefore required between the Application Notifier AN and the frontend interface FE-I as long as the Data Retrieval Scheduler DRS makes sure that between consecutive queries for the same data item i there are not more than f(i) time units.

In the following two procedures are described to determine a schedule, where for each subscription i the data is retrieved with a minimum time interval f(i) between two consecutive retrievals which are based on the so-called pinwheel scheduling problem. The problem can be efficiently solved by the following first procedure for the special case when all notification periods are powers of two and the reciprocals of all notification periods add up to less than 0.5.

The following procedure makes use of the fact that when all f(i)-values are powers of two then there is a schedule if and only if the sum of reciprocals of the f(i) is lesser equal than 1:

maintain a set of subscriptions S and a data retrieval schedule that satisfies all subscriptions S.
upon arrival of a new subscription ('job')
Compute the density d of the existing subscription set S as the sum of reciprocals of the f(i)s
If d=1, reject the new job
Otherwise, accept the new job with a modified period f'(i). This period is defined as the smallest number such that
f'(i) is a power of 2
f'(i) is larger or equal to f(i)
f'(i) is smaller or equal to 1-d.

By using this procedure one can always guarantee that for all accepted subscriptions S the data D can be delivered as promised in the accept message.

In the following an alternative scheduling procedure that is not based on the conventional pinwheel scheduling procedures is shown. For each subscription S of data item i the data item i is termed to be outdated if it has not been queried in the last f(i) time steps. Instead of trying to perfectly schedule a subset of subscriptions S, all subscriptions S are accepted even if this may lead to the situation that data might not be delivered often enough, i.e. freshness of the data cannot be ensured:

accept all jobs
at each time step t
if there are outdated subscriptions, query the data item i with maximum w(i)*f(i) among all outdated subscriptions if there are no outdated subscriptions, consider for each subscription i the time o(i) when it will be outdated. Then query the data item i where $(f(i)-o(i)+t)*w(i)$ is maximal.

This procedure seeks to minimize the time period where data items are outdated. It gives preference to already outdated data items and gives preference to data items with longer periods and larger weights.

In case of multiple M2M applications AP the Subscription Handler SH only needs to keep track which M2M application AP requests which data item. When multiple M2M applications AP subscribe to the same data item, the different weights encoding or representing the importance are added up, so that the final weight of the data item is the sum of the weights assigned by the different M2M applications AP.

When there are multiple M2M frontends FE which are all connected to the M2M backend BE via the same bandwidth limited communication channel, this can be easily implemented since the M2M backend can handle a plurality of M2M frontends FE without any change. In case that each M2M frontend FE has an individual limited bandwidth LB, then the Data Retrieval Scheduler DRS determines a schedule for each individual M2M frontend FE, for example solving the pinwheel scheduling problem for each individual M2M frontend FE.

When one-time queries from an M2M application AP arrive then a query handler may be provided in the backend BE which first looks into the data cache DC whether a recent value of the queried data item is available. If not then the query is submitted to the Data Retrieval Scheduler DRS which tries to find a free time slot to submit the query to the M2M frontend FE. The Data Retrieval Scheduler DRS can also reject the query in case there is no free time slot for it in the near future. In that case the reject message forwarded by the query handler to the M2M application AP.

The query handler can also analyze the frequency of queries for different data items. If some data items are queried often, then the query handler can issue a subscription S for this data item so that fresh values of the requested data are always available in the data cache DC.

For handling of the cancellation of subscription the Subscription Handler SH may notify upon retrieval of a request to cancel a subscription S provided by an M2M application AP the data retrieval scheduler DRS and the Application Notifier AN. The Data Retrieval Scheduler DRS will stop querying for the data and the Application Notifier AN will stop sending notifications.

Subscriptions S can have a pre-specified duration after which they will be cancelled automatically and updates of subscriptions S may be handled similarly like new subscriptions: First the Data Retrieval Scheduler DRS is made aware of the update and then the Application Notifier AN will be notified.

Embodiments of the present invention can be made compatible to the OMA NGSI 9/10 standard defining a data model for context data and operations for querying of the data and subscribing to it. Subscriptions of M2M applications AP can be realized by the SubscribeContext procedure specified in NGSI 10: The SubscribeContext method can be utilized to point out a different notification frequency which is called "throttling interval" in the subscription response.

Further the data transmission can be realized between the M2M frontend FE and the M2M backend BE by the M2M backend BE invoking the QueryContext procedure as defined in NGSI 10. This OMA NGSI 9/10 standard is for example disclosed in the non-patent literature of OMA NGSI Context Management Framework, approved version 1.0: http://technical.openmobilealliance.org/Technical/release_program/docs/NGSI/V1_0-20120529-A/OMA-TS-NGSI_Context_Management-V1_0-20120529-A.pdf.

To summarize embodiments of the present invention can actively control the data transmission between M2M backend(s) and M2M frontend(s) by a scheduling mechanism seeking to optimize the satisfaction of M2M applications. Embodiments of the present invention can further decouple an application notification process from the actual data retrieval and to transform application request patterns into instances in particular of the pinwheel scheduling problem and thus make procedures for this problem applicable for M2M backends.

An embodiment of the present invention provides a method for realizing an effective caching scheme for M2M middleware/M2M backend(s) comprising the steps of
 a) serving all data requests from the cache while notifying a transmission scheduler about all the data requests and
 b) targeting by the data transmission scheduler to maximize the overall freshness of the data items in the cache by solving a minimization problem in particular known as pinwheel problem.

Embodiments of the present invention may provide, inter alia the following advantages: Embodiments may enable active controlling of the data transmission between the M2M backend and M2M frontend(s) making more effective use of the available communication bandwidth and making applications aware of an available communication resource by rejecting subscriptions and thereby improving the user experience.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing M2M data items according to M2M data subscriptions retrieved from an M2M frontend (FE) by an M2M backend (BE) to one or more M2M applications, wherein a communication channel between the BE and FE has a limited bandwidth, the method comprising:
 representing the data items to be provided to the M2M applications by a set of parameters including a required update frequency for the data item and a weight representing an importance of the data item to the one or more M2M applications and/or to the BE;

determining a schedule for retrieving data items from the FE by the BE based on the weights of the data items;

determining that an actual period required to update each of one or more respective data items is larger than a required period corresponding to the required update frequency for each of the respective one or more data items and adding a penalty value to the weight of each of the respective one or more data items to provide updated weights for each of the respective one or more data items;

modifying the schedule based on the updated weights for each of the respective one or more data items such that an overall penalty is minimized, and retrieving, by the BE according to the modified schedule, data items from the FE and caching the retrieved data items.

2. The method according to claim 1, further comprising providing, by the BE, the retrieved data items to the one or more M2M applications.

3. The method according to claim 2, wherein the cached data items are provided from a cache together with non-actuality information by the BE to the one or more M2M applications according to the required period directly after they are retrieved by the BE.

4. The method according to claim 1, wherein caching the retrieved data items comprises caching the retrieved data items in a key-value-store.

5. The method according to claim 1, wherein upon receiving, by the BE, a new data subscription, the method further comprises:

rejecting the new data subscription if the communication channel between the BE and FE lacks bandwidth, or accepting the new data subscription and further modifying the schedule for retrieving data items from the FE by the BE.

6. The method according to claim 5, wherein accepting the new data subscription and further modifying the schedule for retrieving data items from the FE by the BE comprises modifying a required update frequency of a data item of the new data subscription, and wherein further modifying the schedule for retrieving data items from the FE by the BE is performed according to the modified required update frequency.

7. The method according to claim 2, wherein providing, by the BE, the retrieved data items to the one or more M2M applications comprises providing, with each data item provided to the one or more M2M applications, an indication of whether each respective data item is an up-to-date value or an outdated value.

8. The method according to claim 1, wherein if a one-time query for a one-time data item query is provided to the BE, the BE checks whether a recent value for the one-time data item is available in a cache and if yes, provides the recent value for the one-time data, and if not, the one-time query is included into the schedule for retrieving data items from the FE if the query can be satisfied within a certain future time range, otherwise the one time data item query is rejected.

9. The method according to claim 1, wherein each of the M2M data subscriptions includes a timeout parameter that specifies that the respective M2M data subscription will expire after a predetermined time period.

10. The method according to claim 1, wherein the OMA NGSI9/10 standard is used for subscribing and for communication between the BE and the FE.

11. A system for providing M2M data items to one or more M2M applications according to M2M data subscriptions, the system comprising:

an M2M backend (BE) including:

a subscription handler adapted to represent a data retrieval scheduler adapted identify a set of parameters representing the data items to be provided to the M2M applications, the set of parameters including a required update frequency for the data item and a weight representing an importance of the data item to the one or more M2M applications and/or to the BE, and a data retrieval scheduled adapted to determine a schedule for retrieving data items from the FE by the BE based on the weights of the data items, to determine that an actual period required to update each of one or more respective data items is larger than a required period corresponding to the required update frequency for each of the respective one or more data items and adding a penalty value to the weight of each of the respective one or more data items to provide updated weights for each of the respective one or more data items, and to modify the schedule based on the updated weights for each of the respective one or more data items such that an overall penalty is minimized and/or an overall actuality of the cached data is maximized, an M2M frontend adapted to retrieve data items from the FE, a data cache adapted to cache the data items retrieved from the FE, and an application notifier adapted to provide the cached data items to the one or more M2M applications.

* * * * *